United States Patent
Cornwall et al.

(10) Patent No.: US 10,299,073 B2
(45) Date of Patent: May 21, 2019

(54) DYNAMIC GEOFENCE

(71) Applicant: INTERNATIONAL BUSINESS MACHINES CORPORATION, Armonk, NY (US)

(72) Inventors: Andrew B. Cornwall, Tempe, AZ (US); Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/823,989

(22) Filed: Nov. 28, 2017

(65) Prior Publication Data

US 2018/0192243 A1    Jul. 5, 2018

Related U.S. Application Data

(63) Continuation of application No. 15/397,346, filed on Jan. 3, 2017, now Pat. No. 9,924,315.

(51) Int. Cl.
*H04W 24/00*    (2009.01)
*H04W 4/021*   (2018.01)
(Continued)

(52) U.S. Cl.
CPC ........... *H04W 4/022* (2013.01); *H04W 4/025* (2013.01); *H04W 68/00* (2013.01)

(58) Field of Classification Search
CPC ....... H04W 4/021; H04W 4/023; H04W 4/02; H04W 4/22; H04W 4/027; H04W 4/025;
(Continued)

(56) References Cited

U.S. PATENT DOCUMENTS 7,343,317 B2    3/2008    Jokinen et al.
7,912,630 B2    3/2011    Alewine et al.
(Continued)

FOREIGN PATENT DOCUMENTS

CN    1460373    12/2003
WO    2012135155    10/2012

OTHER PUBLICATIONS

Ahmed, Nasimuddim et al.; SmartEvacTrak: a People Counting and Coarse-Level Localization Solution for Efficient Evacuation of Large Buildings; 2015 IEEE International Conference on Pervasive Computing and Communication Workshops (PerCom Workshops); Mar. 23-27, 2015; pp. 372-377.

(Continued)

*Primary Examiner* — Khalid W Shaheed
(74) *Attorney, Agent, or Firm* — Schmeiser, Olsen & Watts; Isaac J. Gooshaw

(57) ABSTRACT

Systems, methods and tools for modifying existing geofence notifications using a plurality of overlapping geofences and geo-fencing rules to alter the notification messages as a function of triggering multiple overlapped geofences simultaneously. Triggering the two overlapping geofences may display notifications tied to a special event, marketing campaign or promotion designated by the subsequent geofence overlaying a pre-existing, first geofence. While the second geofence is active, a modified message may be displayed featuring the special event or marketing campaign. Subsequently, after the second geofence has changed locations, deactivated or deleted, the previously existing geofence may revert back to the originally displayed notification prior to mapping the second geofence targeting the special event or promotion.

17 Claims, 9 Drawing Sheets

(51) Int. Cl.
*H04W 68/00* (2009.01)
*H04W 4/02* (2018.01)

(58) Field of Classification Search
CPC ..... H04W 4/008; H04W 64/00; H04W 4/022; H04W 4/08; H04W 52/0251; H04W 40/20; H04W 40/244; H04W 4/04; H04W 4/206

See application file for complete search history.

(56) References Cited

U.S. PATENT DOCUMENTS

| | | | |
|---|---|---|---|
| 8,812,027 | B2 | 8/2014 | Obermeyer et al. |
| 9,043,329 | B1 | 5/2015 | Patton et al. |
| 9,060,248 | B1 | 6/2015 | Coulombe et al. |
| 9,100,795 | B2 | 8/2015 | Sartipi et al. |
| 9,194,955 | B1 * | 11/2015 | Fahrner ............... G01S 19/16 |
| 9,226,105 | B2 | 12/2015 | Turgman et al. |
| 9,363,221 | B1 | 6/2016 | Ozog |
| 9,648,581 | B1 | 5/2017 | Vaynblat |
| 9,736,636 | B1 | 8/2017 | DeLuca et al. |
| 9,756,607 | B1 | 9/2017 | DeLuca |
| 9,820,097 | B1 | 11/2017 | DeLuca et al. |
| 9,924,315 | B1 | 3/2018 | Cornwall et al. |
| 2008/0139181 | A1 | 6/2008 | Lokshin |
| 2008/0248815 | A1 | 10/2008 | Busch |
| 2008/0312946 | A1 | 12/2008 | Valentine et al. |
| 2009/0164118 | A1 | 6/2009 | Breen |
| 2009/0197582 | A1 | 8/2009 | Lewis et al. |
| 2009/0258636 | A1 | 10/2009 | Helvick |
| 2010/0161207 | A1 | 6/2010 | Do |
| 2011/0093339 | A1 | 4/2011 | Morton |
| 2011/0314144 | A1 | 12/2011 | Goodman |
| 2011/0320259 | A1 | 12/2011 | Roumeliotis et al. |
| 2012/0054028 | A1 | 3/2012 | Tengler et al. |
| 2012/0271715 | A1 | 10/2012 | Morton et al. |
| 2012/0310741 | A1 | 12/2012 | Uyeki et al. |
| 2013/0030931 | A1 | 1/2013 | Moshfeghi |
| 2013/0045760 | A1 | 2/2013 | Obermeyer et al. |
| 2013/0267253 | A1 | 10/2013 | Case et al. |
| 2013/0326137 | A1 | 12/2013 | Bilange et al. |
| 2013/0332274 | A1 | 12/2013 | Faith et al. |
| 2014/0057648 | A1 | 2/2014 | Lyman et al. |
| 2014/0155094 | A1 | 6/2014 | Zises |
| 2014/0162692 | A1 | 6/2014 | Li et al. |
| 2014/0164118 | A1 | 6/2014 | Polachi |
| 2014/0279015 | A1 | 9/2014 | Root et al. |
| 2014/0337123 | A1 | 11/2014 | Nuernberg et al. |
| 2014/0351030 | A1 | 11/2014 | Priebatsch |
| 2014/0379430 | A1 | 12/2014 | Kritt et al. |
| 2015/0011237 | A1 | 1/2015 | Obermeyer et al. |
| 2015/0099461 | A1 | 4/2015 | Holden et al. |
| 2015/0120453 | A1 | 4/2015 | Lee et al. |
| 2015/0199704 | A1 | 7/2015 | Gottesman et al. |
| 2015/0220993 | A1 | 8/2015 | Bente |
| 2015/0269167 | A1 | 9/2015 | Tseng |
| 2015/0269624 | A1 | 9/2015 | Cheng et al. |
| 2015/0271638 | A1 | 9/2015 | Menayas et al. |
| 2015/0271639 | A1 | 9/2015 | Ziskind et al. |
| 2015/0341747 | A1 | 11/2015 | Barrand et al. |
| 2015/0355893 | A1 | 12/2015 | Luk et al. |
| 2015/0365796 | A1 | 12/2015 | Toni |
| 2016/0007151 | A1 | 1/2016 | Birch et al. |
| 2016/0014559 | A1 * | 1/2016 | Hakanson ............. H04W 4/021 455/456.1 |
| 2016/0027056 | A1 | 1/2016 | Taslimi |
| 2016/0034961 | A1 | 2/2016 | May et al. |
| 2016/0057573 | A1 | 2/2016 | Chang et al. |
| 2016/0057576 | A1 | 2/2016 | Kessler et al. |
| 2016/0061609 | A1 | 3/2016 | Dickey et al. |
| 2016/0066141 | A1 | 3/2016 | Jain et al. |
| 2016/0080486 | A1 | 3/2016 | Ram et al. |
| 2016/0183052 | A1 | 6/2016 | Qiu |
| 2016/0253710 | A1 | 9/2016 | Publicover et al. |
| 2017/0019761 | A1 | 1/2017 | Heo |
| 2018/0121957 | A1 | 5/2018 | Cornwall et al. |

OTHER PUBLICATIONS

Bareth, Ulrich et al.; geoXmart—A Marketplace for Geofence-Based Mobile Services; 2010 34th Annual IEEE Computer Software and Applications Conference; Jul. 19-23, 2010; pp. 101-106.

Chu, Hon et al.; I am a Smartphone and I Know My User is Driving; 2014 Sixth International Conference on Communication Systems and Networks (COMSNETS); Jan. 6-10, 2014; 8 pages.

Friedman, Jack P.; List of IBM Patents or Patent Applications Treated as Related; Nov. 28, 2017; 1 page.

Hendrix, Phil, Dr.; Watch this Space—How Mobile and Beacons Are Enhancing the Value of Out-of-Home Media for Advertisers and Mobile App Partners; A whitepaper sponsored by Gimbal; Aug. 2015; 23 pages.

Levent Besik and Alessio Pace, Systems and Methods of Managing Geofences, Technical Disclosure Commons, Apr. 22, 2016, pp. 10.

Mell, Peter et al.; The NIST Definition of Cloud Computing; National Institute of Standards and Technology; Special Publication 800-145; Sep. 2011; 7 pages.

Neilsen Norman Group; Evidence-Based user Experience Research, Training and Consulting; https://www.nngroup.com; retrieved from the Internet Sep. 28, 2017; 5 pages.

Roy, Nirupam et al.; I am a Smartphone and I can Tell my User's Walking Direction; Proceedings of the 12th Annual International conference on Mobile Systems, Applications and Services; Jun. 16-19, 2014; pp. 329-342.

Ruckus Wireless; Location: The New Battlefield for Business & Digital Innovation; www.ruckuswireless.com; 2014; 9 pages.

Zin, M.S.I.M et al.; Development of Auto-Notification Application for Mobile Device using Geofencing Technique; Journal of Telecommunication, Electronic and Computer Engineering (JTEC) vol. 7, No. 2, Jul.-Dec. 2015, pp. 169-173.

* cited by examiner

DYNAMIC GEOFENCE

CROSS REFERENCE TO RELATED APPLICATIONS

This application is a continuation application claiming priority to U.S. patent application Ser. No. 15/397,346 filed on Jan. 3, 2017, now U.S. Pat. No. 9,924,315, issued Mar. 20, 2018, entitled DYNAMIC GEOFENCE, which is hereby incorporated by reference.

TECHNICAL FIELD

The present disclosure relates generally to systems, methods and tools for creating, displaying and utilizing geofences.

BACKGROUND

As portable devices, such as mobile communication systems, smart phones, tablet computers, laptops and navigation devices, become more advanced and powerful, these portable devices increasingly provide locational guidance to users in real time. More recently, portable devices have introduced a concept known as geo-fencing. A geofence is a virtual perimeter around a real-world location. Portable devices that implement geo-fencing functionalities may alert the user when the portable device has entered or exited an established geofence.

A geofence's perimeter may be virtually established around a point of interest such as an address, a store, or a home. Programs that incorporate geo-fencing allow an administrator of a geofence to set up triggers so when a device enters (or exits) the boundaries of the geofence (defined by the administrator), a push notification, text message or email alert may be sent. Many geo-fencing applications incorporate Google® Earth, allowing administrators to define boundaries on top of a satellite view of a specific geographical area. Other applications may define boundaries by longitude and latitude or through user-created and Web-based maps.

SUMMARY

A first embodiment of the present disclosure provides a method for dynamically displaying geofences comprising the steps of: creating, by a processor, a moveable parent geofence, wherein the movable parent geofence is broadcasted by a mobile computer system transported by a user having variable location changes as a function of a movement of the user; further creating, by the processor, a first child geofence and a second child geofence; determining, by the processor, a location of a client device; triggering, by the processor, a notification as a function of the location of the client device residing within either a boundary of the moveable parent geofence and a boundary of the first child geofence or the boundary of the moveable parent and a boundary of the second child geofence; displaying, by the processor, the notification as a function of triggering both the moveable parent geofence and the first child geofence or the moveable parent geofence and the second child geofence.

A second embodiment of the present disclosure provides a computer system, comprising: a central processing unit (CPU); a memory device coupled to the CPU; and a computer readable storage device coupled to the processor, wherein the storage device contains program code executable by the CPU via the memory device to implement a method for dynamically displaying geofences comprising the steps of: creating, by the CPU, a moveable parent geofence, wherein the movable parent geofence is broadcasted by a mobile computer system transported by a user having variable location changes as a function of a movement of the user; further creating, by the CPU, a first child geofence and a second child geofence; determining, by the processor, a location of a client device; triggering, by the CPU, a notification as a function of the location of the client device residing within either a boundary of the moveable parent geofence and a boundary of the first child geofence or the boundary of the moveable parent and a boundary of the second child geofence; displaying, by the CPU, the notification as a function of triggering both the moveable parent geofence and the first child geofence or the moveable parent geofence and the second child geofence.

A third embodiment of the present disclosure provides a computer program product comprising: one or more computer readable hardware storage devices having computer readable program code stored therein, said program code containing instructions executable by the one or more central processing units (CPU) to implement a method for dynamically displaying geofences comprising the steps of: creating, by the CPU, a moveable parent geofence, wherein the movable parent geofence is broadcasted by a mobile computer system transported by a user having variable location changes as a function of a movement of the user; further creating, by the CPU, a first child geofence and a second child geofence; determining, by the processor, a location of a client device; triggering, by the CPU, a notification as a function of the location of the client device residing within either a boundary of the moveable parent geofence and a boundary of the first child geofence or the boundary of the moveable parent and a boundary of the second child geofence; displaying, by the CPU, the notification as a function of triggering both the moveable parent geofence and the first child geofence or the moveable parent geofence and the second child geofence.

DETAILED DESCRIPTION

Overview

Figure 1:
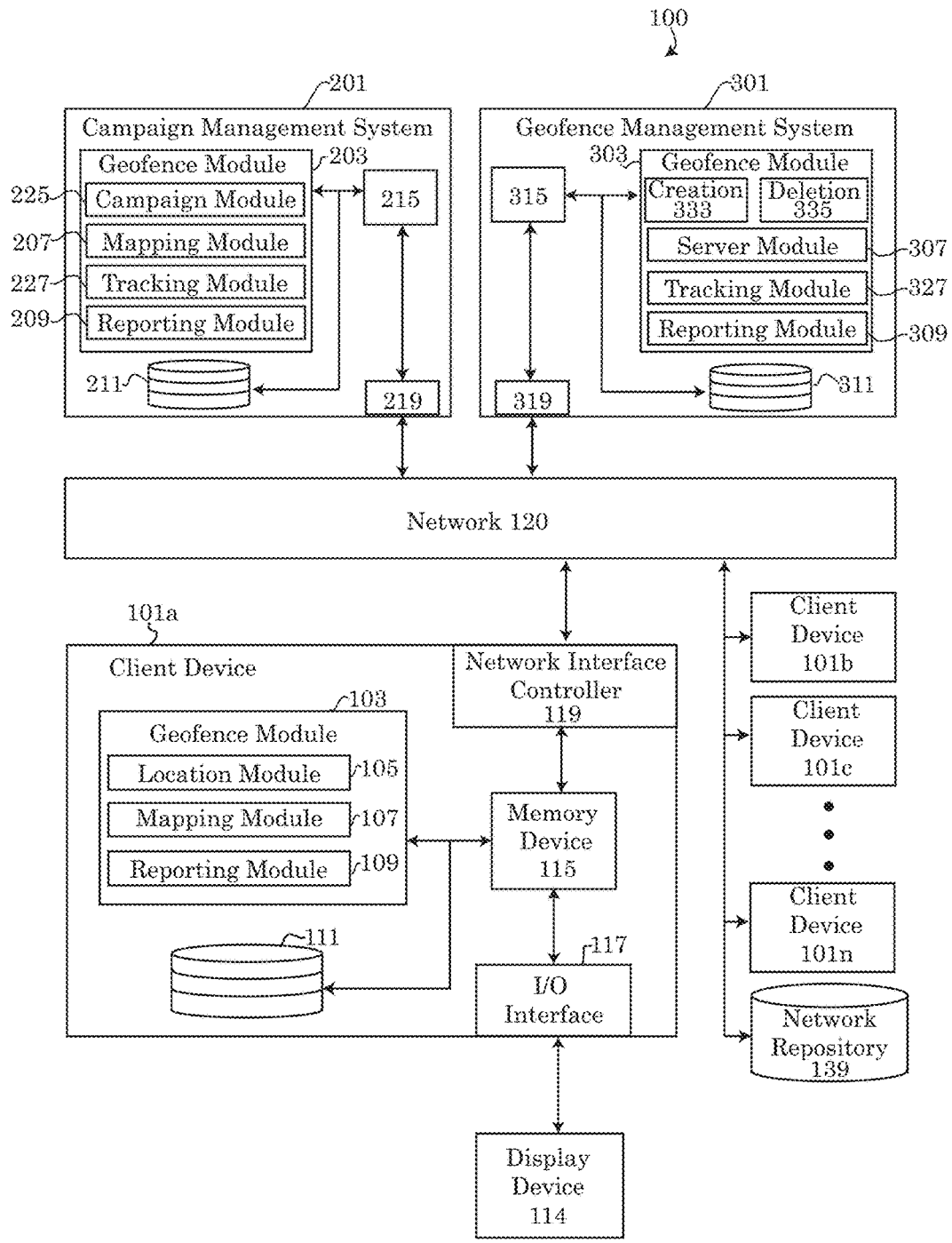
FIG. 1 depicts a schematic view of an embodiment of a system for triggering a geofence notification consistent with the embodiments of the present disclosure.
Figure 2:
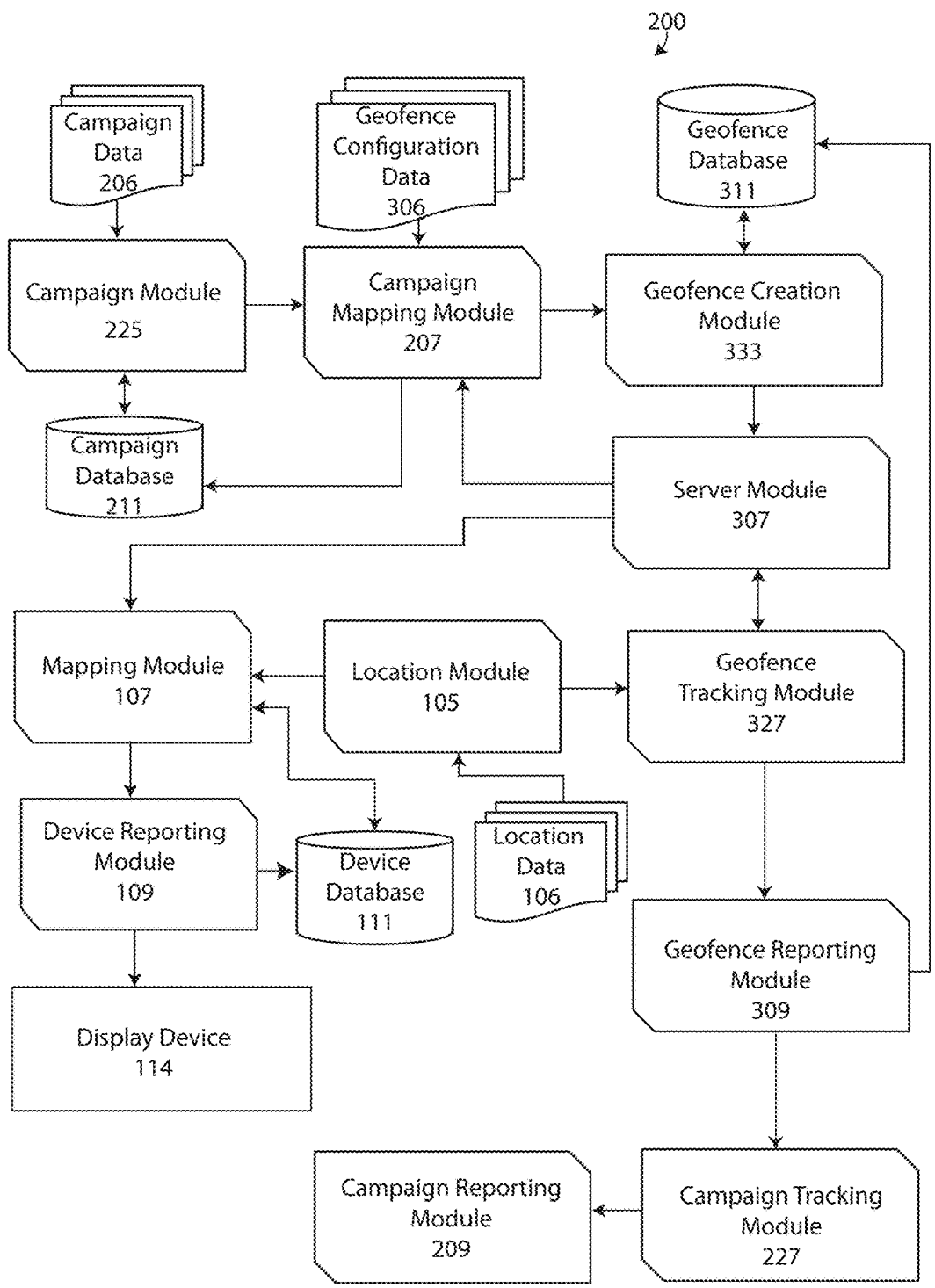
FIG. 2 depicts a flow chart describing the system for triggering a geofence notification.

Embodiments of the present disclosure recognize that currently available geofence systems displaying messages to users, potential clients and computer systems do not dynamically adjust or modify the geofence messages based on new or temporary events and/or cross promotions that may occur periodically. Standard geofences are typically static to a location defined during a creation phases. When currently available geofences are created, the virtual barrier may persist perpetually and display a pre-programmed message for each particular geofence until the geofence is removed, deactivated or replaced with a new geofence having a different notification message. There is a need for dynamic geofences that may be altered and triggered in a different manner than the standard geofences to display a new or different notification message, without replacing or deleting the geofences previously positioned at a particular location.

Embodiments of the present application may utilize multiple concurrent overlapping geofences to modify notifications presented by one or more previously existing geofences. Using overlapping geofences to modify the notification messages allows existing notifications to be altered on a temporary basis, while the overlapping geofence is mapped and activated. For example, the overlapping geofence (parent geofence) may be mapped during special events or special promotional periods, such as a holiday or live event. By overlapping existing geofences (child geofence) with a parent geofence altering the notification displayed when both geofences are triggered simultaneously or near simultaneously, the geofences may appear to be acting dynamically. Triggering the two overlapping geofences may be displaying notifications tied to a special event while the parent geofence is active and reverting the notification of the child geofence back to the child geofence's previous notification as soon special event or promotion has ended by deactivating or deleting the parent geofence.

In some embodiments of the dynamic geofence system, the parent geofence may be positioned in a static location, encompassing one or more child geofences that may be mapped within or overlapped by the parent geofence. In alternative embodiments, the parent geofence may move from location to location along a programmed path. As the parent geofence moves along the programmed path, the parent geofence may be consistently altering a number of child geofences temporarily as each child geofence is overlapped by the parent geofence while the programmed path changes the location of the parent geofence. An embodiment having a moving parent geofence may be suitable for events are moving as well, for example marathons, parades, parties, festivals, or any event that may change the focus of the event to different locations while the event is occurring.

In some embodiments, the location of the moving parent geofence may be linked to a person or a device carried by a person (such as a celebrity, influential figure or event organizer) during a special promotion. For example a marketing promotion that uses the celebrity to visit multiple locations, such as book tour, or movie promotion. Using the book tour as the example, the book stores that are scheduled to receive the celebrity appearance may have a previously established child geofence in place that may be normally set up to push notifications to client devices near or inside the book store. However as the celebrity enters the book store's geofence, the parent geofence following the celebrity, may overlap the book store geofence and override the child geofence's notifications. Instead, pushing a special event notification to client devices rather than the notification of the child geofence. Once the celebrity leaves the book store, the parent geofence may follow and thus the child geofence located around the book store may display the book store's standard notification again, rather than the special event notification.

Dynamic Geofence System for Altering Notifications

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Referring to the drawings, FIG. 1 depicts a block diagram of a dynamic geofence system 100 (hereinafter "geofence system 100") capable of altering and modifying notifications of geofences using a parent geofence overlapping a child geofence to change the notification messages of the child geofence. Embodiments of the geofence system 100 may include a plurality of one or more computer systems 101a-101n, 201, 301 including client devices 101a, 101b, 101c . . . 101n, campaign management system 201 and a geofence management system 301. The number of client devices 101a, 101b, 101c . . . 101n (referred collectively as "client devices 101") may not be limited to the number of devices depicted in the drawings. The number of client devices 101 may be any number of client devices 101 supported by network 120. Client device 101n identifies the last client device 101 in a plurality of client devices connected to the network 120 and not specifically the $4^{th}$ client device.

Figure 9:
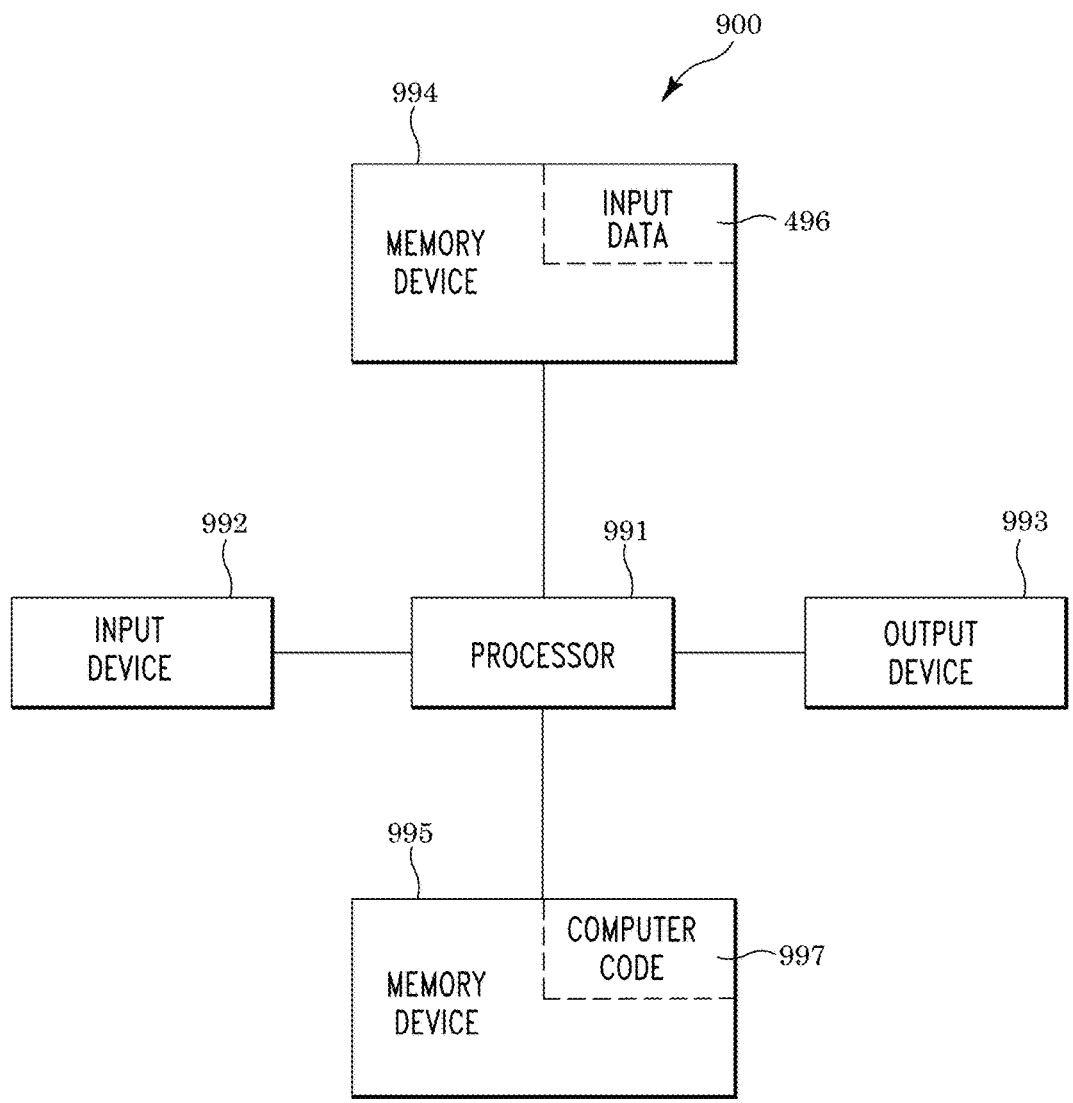
FIG. 9 depicts a block diagram of an embodiment of a generic computer system capable of implementing methods for providing a geofence notification consistent with the embodiments described in this application.

The computer systems 101, 201, 301 may each be a specialized computer system, comprising specialized configurations of hardware, software or a combination thereof as depicted in FIGS. 1-7 of the present disclosure and in the embodiments described herein. Embodiments of the computer systems 101, 201, 301 may not only comprise the elements of the systems and devices depicted in FIG. 1-7, but may also incorporate one or more elements of a generic computer system 900 as shown in FIG. 9 and described in the COMPUTER SYSTEM section detailed below. One or more elements of the generic computer system of FIG. 9 may be integrated into the specialized computer systems 101, 201, 301 of FIGS. 1-7.

Each of the computer systems 101, 201, 301 may each be connected and placed in communication with one another over a computer network 120. Embodiments of the network 120 may be constructed using wired or wireless connections between each hardware component connected to the network 120. As shown in the exemplary embodiments, each of the computer systems 101, 201, 301 may connect to the network 120 and communicate over the network using a network interface controller (NIC) 119, 219, 319 or other network communication hardware. Embodiments of the NICs 119, 219, 319 may implement specialized electronic circuitry allowing for communication using a specific physical layer and a data link layer standard. For example Ethernet, Fiber channel, Wi-Fi or Token Ring. The NIC 119,

219, 319 may further allow for a full network protocol stack, enabling communication over network 120 to the group of computer systems or other computing hardware devices linked together through communication channels. The network 120 may facilitate communication and resource sharing among the computer systems 101, 201, 301 and additional hardware devices connected to the network 120, for example a network accessible storage device such as the network repository 139. Examples of network 120 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

In some embodiments of the geofence system 100, the geofence system 100 may include a campaign management system 201. The campaign management system 201 may perform the functions, tasks and services of system 100 directed toward creating a marketing campaign, campaign messages and messaging events associated with the marketing campaign that may be integrated into notifications of a parent geofence or a child geofence. The campaign management system 201 may provide configuration information to the geofence management system 301 during each geofence setup, link the geofence to the marketing campaign, track the status of the marketing campaign and the success of each campaign message being delivered to the client devices 101 encountering the marketing campaigns of the parent and child geofences.

Embodiments of the computer systems 101, 201, 301 may each include a geofence module 103, 203, 303. The term "module" may refer to a hardware based module, software based module or a module may be a combination of hardware and software resources. A module (whether hardware, software, or a combination thereof) may be designed to implement or execute one or more particular functions, tasks or routines of the computer systems 101, 201, 301. Embodiments of hardware based modules may include self-contained components such as chipsets, specialized circuitry and one or more memory devices. A software-based module may be part of a program code or linked to program code containing specific programmed instructions loaded in the memory device 115, 215, 315 of the specialized computer systems 101, 201, 301 of the geofence system 100.

Embodiments of the geofence module 203 of the campaign management system, whether hardware, software or a combination thereof, may perform the functions and tasks associated with the creating the marketing campaign, linking the campaign to a child geofence and/or a parent geofence, mapping each geofence onto an interface viewable by an administrator or user of the campaign management system, tracking the interactions between the client device 101 and parent and/or child geofence as well as reporting the interactions tracked by the campaign management system 201. Embodiments of the geofence module 203 of the campaign management system 201 may include sub-modules designated with performing the individual tasks, routines and services of the geofence module 203 described briefly above. Various embodiments of the geofence module 203 may comprise a campaign module 225, mapping module 207, tracking module 227 and a reporting module 209.

Embodiments of the campaign module 225 may perform the task of creating, organizing, storing and transmitting marketing campaign data 206, including the creation, storage and transmission of campaign messages programmed into the notifications of the parent geofence or the child geofence. In some embodiments, the campaign module 225 may store the created campaign messages in a campaign management database 211.

In some embodiments, the campaign module 225 may set one or more parameters of the marketing campaigns being stored and managed by the campaign management system 201 and the campaign management database. The marketing campaign system module may manage marketing campaign and the campaign messages delivered by the child geofence once the child is triggered individually and the campaign module 225 may additionally manage the special events, promotions and altered campaign messages displayed as notifications when the parent geofence and child geofence are triggered simultaneously.

During the creation of parent or child marketing campaign, a user may provide campaign input data 206 into the campaign management system 201 to establish a configuration of the marketing campaign. For example, the campaign input data 206 entered into the campaign management system 201 may direct the campaign module 225 to configure a campaign with a specified start date/time, duration for the marketing campaign, and an end date/time establishing an expiration of the marketing campaign. The campaign module 225 may receive different inputs for the parent marketing campaign and the child marketing campaigns. Each of the marketing campaigns may overlap in duration, however the parent marketing campaign directed toward a special or limited marketing event may have a shorter duration. Although the application discusses the creation of the parent/child marketing campaigns contemporaneously as well as the creation of the parent and child geofences contemporaneously, there is no requirement for the parent and child geofences or marketing campaigns to be created at the same time or at any time near one another. A child campaign/geofence may have previously existed for any amount of time (including many years) before the parent campaign/geofence is eventually created. The parent campaign/geofence may be introduced at any time during an activated child campaign to alter the notifications delivered by the child campaign/geofence.

Embodiments of the campaign input data 206 may further define parameters to the campaign module 225 for creating the parent and child marketing campaigns. The campaign input data 206 may include information such as the organizer of the campaign, for example the individuals or companies running a promotion, the locations or regions that may be included or excluded from the marketing campaign, the campaign messages and the name of the campaign. Additionally, the campaign input data 206 may further direct the campaign module's 225 creation or selection of the specific campaign messages, promotions, advertisements or other intellectual property associated with the marketing campaign that may be delivered to participants of the campaign. Embodiments of the campaign module 225 may load each of the marketing campaigns, the campaigns' parameters and the campaign messages into memory device 215 or the campaign management database 211. The campaign module 225 may modify, transmit or retrieve the marketing campaign data configured and stored by the campaign management system 201 at a later point in time or when requested to do so by a separate computing system such as the geofence management system 301 or client device 101.

In some embodiments of the campaign management system 201, the geofence module 203 may further include a mapping module 207. The mapping module 207 may perform the function of configuring the campaigns linked to the geofences of the parent and child geofences and further communicate the proposed parameters of each parent and child geofence to the geofence management system 301 during the geofence creation process. During the configuration of the parent and/or child geofence, an administrator of each geofence may utilize the campaign management system 201 to set one or more parameters of the geofence. The administrator of each geofence may link the parent or child geofences to marketing campaign of the campaign module 225. For example, the mapping module 207 may receive geofence configuration data 306 from an administrator of the campaign management system 201 defining the properties of each parent or child geofence. The geofence configuration data may include data defining each geofences' name, location, and size or virtual boundary limits (i.e. longitude, latitude and radius). In some embodiments, the geofence configuration data 306 entered into the mapping module 207 may include input data defining a start date and time as well as the end date and time (also referred to as the expiration date) of the parent or child geofence.

In some embodiment of the geofence system 100, the mapping module 207 may retrieve creation and expiration dates for each geofence from the campaign module 225. The mapping module 207 may execute a command to load the marketing campaign's parameters created by the campaign module 225 into the memory device 215 of the campaign management system 201 during the geofence configuration process. In alternative embodiments, mapping module 207 may import or apply the parameters of the parent or child marketing campaigns stored by the campaign management database 211 into the mapping module during the configuration of the parent geofence and/or the child geofence. For example, the mapping module 207 may be programmed to retrieve and load a parent or child marketing campaign by a name previously designated by the campaign module 225.

Geofence configuration data 306 inputted into the mapping module 207 may further configure one or more acceptable geofence transitions that may be used to trigger the notifications displayed by the child geofence or the altered notifications displayed by the combination of the child and parent geofence. The geofence transitions that may trigger the geofences may include entering, exiting or dwelling within the geofence. A triggered geofence may transmit a push notification or other campaign message to a client device 101 interacting with the child geofence or child geofence that has been modified by an overlapping parent geofence, once each of the geofences has been established and activated.

The mapping module 207 may configure response provided by the geofence upon the occurrence of one or more of the programmed transitions. For example, in some embodiments, when a client device 101 breaches a virtual boundary of a child geofence (entering or exiting), a child geofence notification may be transmitted to the client device 101, describing nearby events, activities, promotions, encourage the user to come back soon or visit other nearby geofences. When the child geofence is overlapped with the parent geofence, entering, exiting or dwelling within the virtual boundary of the child geofence may trigger both the child and parent geofence simultaneously, resulting in the transmission of an altered notification (different from the child notification) which may be specific to the special event, promotion or activity of the parent geofence.

Embodiments of the mapping module 207 may transmit the configuration settings of the geofence from the campaign management system 201 to the geofence management system 301. The transmission may occur over network 120. For example, the mapping module 207 may encode and compress the configuration data and/or transmit the geofence configuration data over the network 120. In some embodiments, the campaign management system 101 may transmit an API call to the geofence management system 301, requesting the geofence management system 301 create a parent and/or child geofence with the properties prescribed by the mapping module 207 (described below).

Embodiments of the geofence module 203 may further comprise a tracking module 227. The tracking module 227 may perform the tasks of collecting data and statistics about the child geofence, parent geofence modifying the child geofence and the marketing campaigns which may be associated with either geofence. The tracking module 227 may be responsible for gauging the success or failure of each of the marketing campaigns as a function of the statistics gathered and received from the geofence management system 301 creating, monitoring and reporting client device 101 interaction with each of the parent and child geofences.

Embodiments of the tracking module 227 may further receive and store identifying information about each of the users and the user's client device 101 collected by the tracking module 327 of the geofence management system 301. Identifying information or data 210 may include a user's name, age, email address, home address, social media usernames and location information provided to the client device 101. The tracking module 227 may draw statistical conclusions about the success or failure of the marketing campaign of the child geofence or the modified campaign of the parent geofence. For example, the tracking module 227 may analyze the number of client devices 201 triggering a child and/or geofence's campaign message notification, the viewing time of the parent or child notifications, whether or not the notification messages were accepted or deleted, whether or not the users of the client devices 101 participated in the content of the parent or child notification messages being delivered as well as identifying demographics such as the age of the users receiving the campaign messages. The tracking module 227 may further compare and identify popularity trends and increased (or decreased) participation in marketing campaigns modified by the special promotions and events of the parent geofence.

Embodiments of the tracking module 227 may analyze the data collected from the client devices 101 and draw conclusions about the efficiency of the child geofence campaign and the increased notification views during special events that modified the child geofence campaign with the parent geofence campaign, including the identification of increases in the target demographics. The tracking module 227 may compare the child and parent geofences and marketing campaign data with previous campaigns and geofences to identify the success of the campaign relative to previous campaigns and special events, promotions and alterations by past parent geofences that may have previously expired. The tracking module 227 may report the statistics and conclusions to the reporting module 209. Embodiments of the reporting module 209 may generate one or more reports as a function of the statistics and conclusions collected and drawn by the tracking module 227. The reporting module 209 may present and display reports of the marketing campaign and campaign linked geofences to an administrator of the campaign management system 201. In some embodiments, the statistics, conclusions and data collected by the tracking module 207 may be archived in the campaign management database 211 or a network accessible repository 139 for further analysis or comparison with future marketing campaigns and geofences.

As shown in FIG. 1, embodiments of the geofence system 100 may include a geofence management system 301. The geofence management system 301 may perform the tasks and functions of creating, deleting, mapping, tracking and generating child and parent geofences which may be affiliated with one or more marketing campaigns. The geofence management system 301 may perform tasks of the geofence system 100 in a manner designated by the campaign management system 101 and may further perform the task of serving the created parent and child geofences to a plurality of client devices 101 being tracked by the geofence management system. The geofence management system 301 may include a geofence module 303 to perform the designated tasks and functions a geofence management system 301.

Similar to the geofence module 203 of the campaign management system 201, the geofence module 303 of the geofence management system 301 may be a hardware module containing specialized chipsets and circuitry and/or or a software module loaded in the memory device 315 of the geofence management system 301. Embodiments of the geofence module 303 may include a creation module 333, deletion module 335, server module 307, tracking module 327 and a reporting module 309.

Embodiments of the creation module 333 may perform the task of generating the parent and child geofences according to the geofence configuration data 306 inputting the desired configuration settings for each of the geofences. The creation module 333 may receive the configuration settings for the parent or child geofences from the mapping module 207 and/or the campaign module 225 of the campaign management system 201 in some embodiments. In alternative embodiments, the geofence configuration data 306 and the parent and/or child geofence settings may be inputted directly into the geofence management system 301. The request to build each of the geofences to the specification of the campaign management system 201 may be received from the campaign management system in the form of an API call. The API call may be loaded in the memory device 315 of the geofence management system 301. The creation module 333 may analyze configuration settings of the parent and/or child geofences requested by the campaign management system 301, confirm the settings are feasible or error free.

If the configuration settings for the parent or child geofence are not feasible or contain errors, the geofence creation module 333 may deny the request and further request a correction of the errors. For example, the parent geofence may overlap the virtual boundary of the child geofence in order to alter the child geofence's notification message. During the creation of the parent geofence, the creation module 333 may identify and report an error if the parent virtual boundary (including location and size) of the parent geofence does not overlap with the child geofence. Otherwise, if the configuration settings are feasible and error free, the creation module 333 may build the parent geofence and/or child geofence according to the requested parameters, including the requested duration, expiration date, start time, start date, end time, end date, location, size, virtual boundary shape, the applicable transitions for triggering the parent or child geofence, the notification messages of the child geofence and the notifications altering the child geofence when the parent geofence is simultaneously triggered alongside the child geofence.

Embodiments of the creation module 333 may save and store the parent and child geofences and the parent and child geofence parameters in a geofence management database 311 or network accessible database such as a repository 139, data mart or other data structure. Saving and storing each of the geofences and the configuration settings or parameters (including campaign messages) may, in some embodiments, allow for the geofence management module 301 to repeatedly create the same parent or child geofences periodically. For example, a particular marketing event or special promotion may once a week, month, year, etc. The campaign management system 201 may in some embodiments, periodically send an API call to execute a parent geofence by a particular geofence name or marketing campaign name to modify a notification displayed by one or more triggered child geofence. In response, the creation module 333 may query or lookup the parent geofence in the geofence management database 311 and load the previously stored configuration settings and parameters into memory device 315 and update the database entry to include a newly scheduled starting date, duration and expiration date for the parent geofence to modify the child geofence.

Embodiments of the geofence module 303 may further comprise a mapping module 307. The server module 307 may perform the tasks of loading one or more active geofences to a mapping interface 302, accessible by one or more client devices 101. The server module 307 may transmit the geofences (created by the creation module 333) to one or more client devices 101 accessing the parent or child geofences over network 120. The client devices 101 connecting to the geofence management system 301 may retrieve, store, download or actively stream the parent and/or child geofence data over network 120. Embodiments of the tracking module 327 may collect location data 106, identifying user information, statistics of each of the geofences, the number of times the parent or child geofence is activated by client devices 101, the number of notifications served to the client devices 101 and transmit the collected data from the geofence management system 301 to the tracking module 227 of the campaign management system 201.

Embodiments of the tracking module 327 may identify conditions giving rise to the triggering of the child geofence notifications and the altered geofence notifications of special events and promotions occurring as a function of triggering the parent and child geofences simultaneously. As a client device 101 receiving the parent or child geofence impinge on a virtual boundary of the geofences mapped by the mapping module 307, or dwells within the virtual boundaries of the geofences, the tracking module 327 may identify the triggering transition and transmit the notification message resulting from transition's occurrence, depending on whether the parent and child are both active and which geofence is being triggered by the client device 101.

Triggering the child geofence or both the parent and child geofence may cause the server module 307 to transmit notifications to the tracked devices 101, including push notifications, emails, short messaging service (SMS) data or direct messaging service data. The notifications transmitted from the geofence server module 307 to the device's mapping module 107 may be triggered as a function of the tracking module 327 identifying a client device 201 triggering one or more active child and parent geofences.

In some embodiments of the geofence management system 301, the geofence module 303 may include a reporting module 309. The reporting module 309 of the geofence management system 301 may perform the function of transmitting statistical information about the parent and child geofences and the information collected by the geofence management system 301 during the activation of child geofence and/or the parent geofence. The reporting module 309 may transmit the data to one or more computer systems 101, 201, 301 over network 120. For example, the reporting module 309 may be responsible for transmitting data collected by the tracking module 327 to the campaign tracking module 227. The reporting module 309 may transmit statistics and data that may assist the campaign tracking module 227 with identifying the success or failure of the child or parent geofence's marketing campaign, the number of interactions users have with each of the geofences, an increase or decrease in the number transitions during the special event, promotion or campaign of the parent geofence, demographic information about users interacting with each of the geofences, the attachment rate or rate at which child notifications and special event notifications were positively or negatively received and/or acted upon by users of a client device 101. The reporting module 309 may further identify the statuses of the parent and child geofences and whether or not each geofence is currently active, deactivated or deleted by the deletion module 335.

Embodiments of geofences system 100 may select a deletion date for deleting the parent or child geofence that may occur at the end date of a marketing campaign or in alternative embodiments, the deletion date may occur automatically at a pre-set time after the marketing campaign has concluded. For example, the pre-existing child geofence may exist for an extended period of time, whereas a new special event utilizing a parent geofence may modify the marketing campaign of the child geofence for a limited amount of time that is less than the remaining active time of the child geofence. The parent geofence may exist for a limited time and be scheduled to be deactivated or deleted before the child geofence. Thus, the child geofence may be overlapped by the parent geofence and display an altered notification when both the parent and child geofences are triggered for a limited time. Subsequently, the parent geofence may be deactivated or deleted by the deletion module 335 at the programmed time/date, however the child geofence may remain active and display the notification programmed to be displayed when the child geofence is triggered, but not the parent geofence.

In some embodiments of the geofence system 100, the system 100 may include one or more client devices 101 connected to the campaign management system 201 and/or geofence management system 301 via the computer network 120. A client device 101 may be any type of mobile computing device that may be capable of moving or changing locations. Some examples of client devices 101 may include, but are not limited to mobile communication devices, smart phones, cell phones, laptops, tablet computers, smart watches and glasses, personalized data assistants (PDA) and wireless or internet enabled media devices. The client devices 101 may be any type of touch point device capable of acting as a point of interaction with the parent of child geofences created by the geofence management system 301. The client devices 101 are not limited only to the number of devices depicted in the figures of the current application. Any number of client devices 101 may part of the geofence system 100 and connected to network 120. As shown in FIG. 1, the number of client devices may be open ended. The client devices 101 include client devices 101a, 101b, 101c . . . 101n, wherein the ellipses represent an infinite number of client devices 101 that may be present between 101c and the nth client device 101n, identified as the last device in the set of a plurality of client devices 101.

Embodiments of the client devices 101 may include a geofence module 103. The geofence module 103 may provide access and interaction with the parent and/or child geofences created and activated by the geofence management system 301. The geofence module 103 may be specialized hardware physically connected within the client device or the geofence module 103 may be software program or program instructions loaded in the memory device 115 of the client device 101. In alternative embodiments, the geofence module 103 providing access to the parent and child geofences may be virtualized hardware that may be physically accessible via network 120 or remotely accessible program executing program instructions for transmitting, receiving and displaying the data of the parent and child geofences (and associated notifications). For example, the client device 101 may be accessing a virtualized geofence module through program or application services maintained by a cloud computing network.

Embodiments of the geofence module 103 may include a location module 105. The location module 103 may be comprised of hardware and/or software capable of utilizing a positioning system to pinpoint the current location of the client device 101 and/or previously stored locations of the client device 101 that may be saved in the memory device 115 or database 111. For example the location module 105 may utilize the positioning capabilities of the global positioning system (GPS), Wi-Fi, Bluetooth of Bluetooth low energy beacons, cell tower triangulation or a combination of positional systems. In some embodiments, the location module 105 may include a transmitter, receiver and/or transceiver for receiving location data 106 from a positioning system or broadcasting the location data 106 to the geofence management system 301. Embodiments of the location module 105 may save, store and update one or more sets of location data 106 to a memory device onboard the location module 105 or, the location module 105 may store the location information to memory device 115 or database 111.

Embodiments of the location module 105 may communicate the stored location data 106 to the geofence management system 301 in order to allow the tracking module 327 to track the location of the client device 101, compare the location data 106 with the established parent of child geofences, collect relevant data about the client device 101 or the device's user, entering, exiting or dwelling within the established geofences and push one or more notifications to the devices 101 triggering the transitioning conditions of the child geofence or simultaneously triggering the child and parent geofences.

The client device 101 may further comprise a mapping module 107. The mapping module 107 may perform the function of plotting the current device location 304 of the client device 101, monitor the position of the client device 101 in real time as the client device changes location. Embodiments of the mapping module 107 may receive the geofence data of the parent and child geofences from the geofence module 303 of the geofence management system 301. In particular, the mapping module 107 may download or retrieve updated geofence data from the geofence server module 307. The device's mapping module 107 may plot each of child geofences and parent geofences as a function of the geofences' data onto a mapping interface 302. In some embodiments, the mapping interface 302 may or may not display the geofences' virtual barriers, instead the virtual barriers of the geofence may be hidden and may only display a designated notification upon triggering a geofence loaded by the mapping module 107. In some of the embodiments shown in FIG. 3-7, the locations of the geofences may be shown on the mapping interface 302 for demonstration and explanatory purposes.

Figure 3:
FIG. 3 illustrates an embodiment of geofence module displaying a mapping interface.

As shown by the Example in FIG. 3, the mapping module 107 may display the client device's 101 location 304 (referred to as "device location 304") onto a map interface 302 in real time, as a function of the location data 106 collected by the location module 105. The map interface 302 may depict the location surrounding the client device's current device location 304. As the client device 101 updates the location data received from the location module 105, the device location 304 may be mapped onto the mapping interface 302 accordingly.

Figure 4:
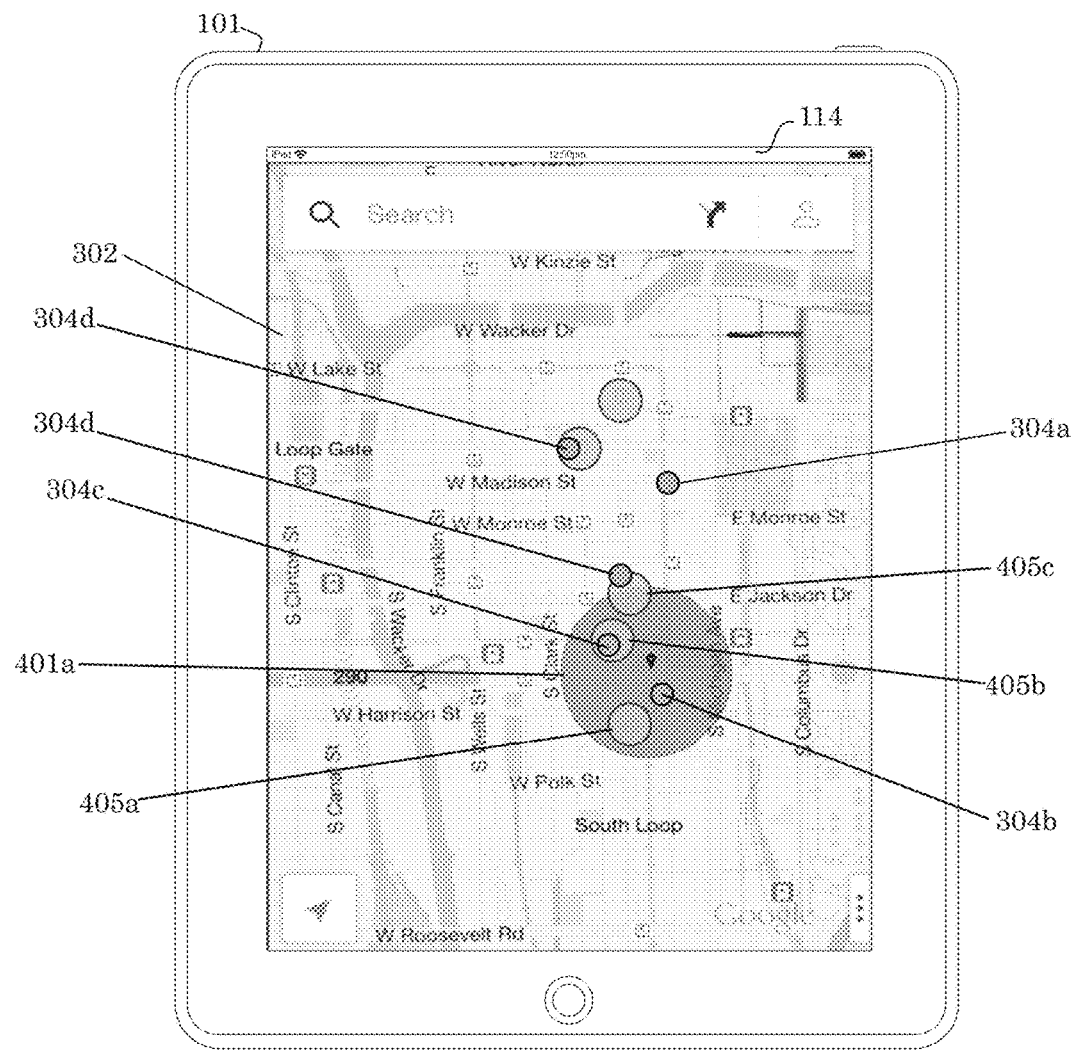
FIG. 4 illustrates an embodiment of the mapping interface of FIG. 3 mapping parent and child geofences thereon.

As shown in the figures, the mapping module 107 may map a plurality of geofences 401a, 401b, 405a, 405b, 405c, 405d, 405e to the mapping interface 302. As shown in FIG. 4, the mapping interface 302 may include a parent geofence 401a and one or more child geofences 405a, 405b, 405c overlapping with the virtual boundary of the parent geofence 401a (either partially or entirely). Each of the device locations 304a to 304d (referred collectively as "device locations 304") may represent a pattern of movement of a single client device 101 over a period of time or may represent a plurality of client devices 101 interacting with one or more geofences mapped to the mapping interface 304.

Figure 5:
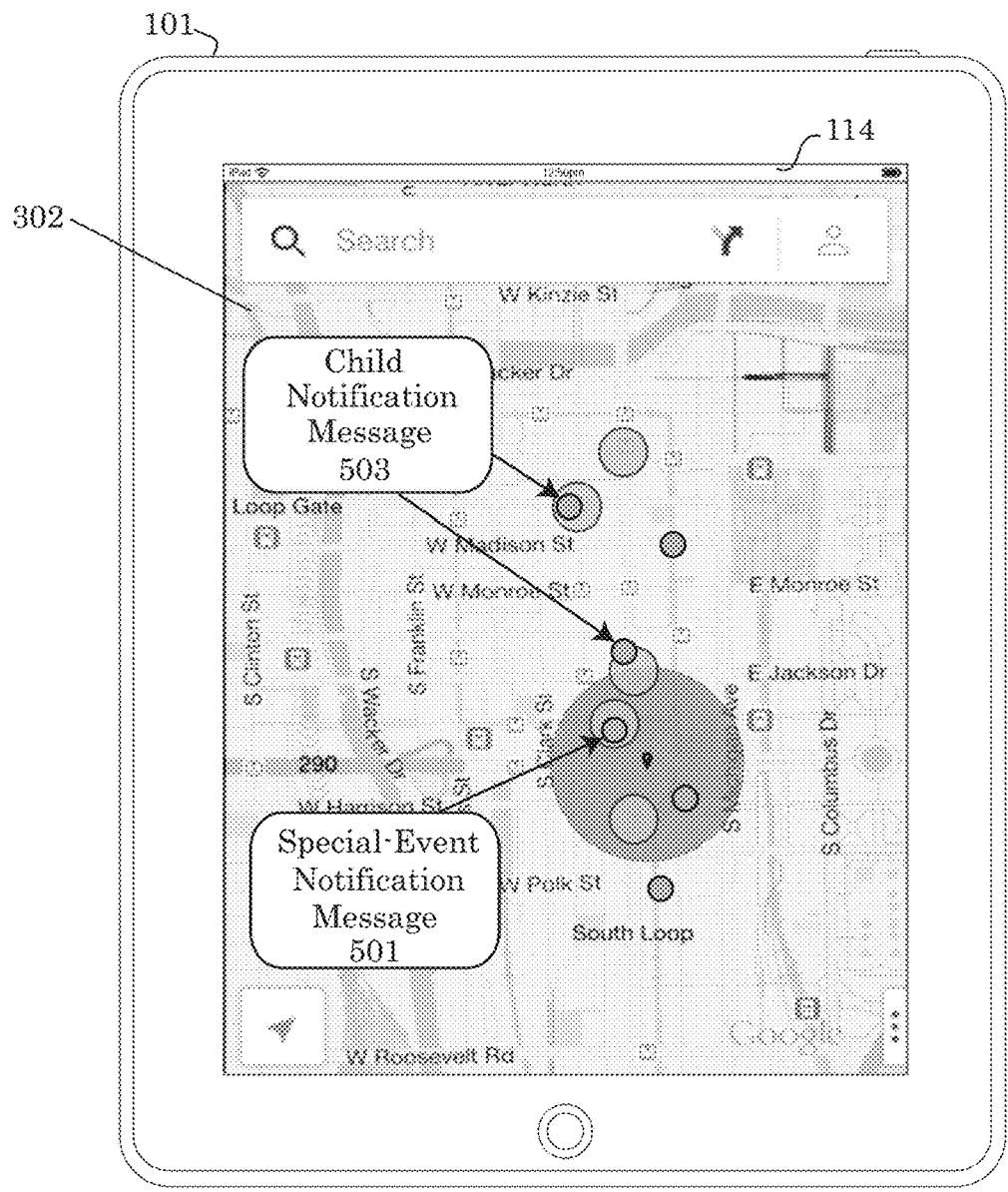
FIG. 5 illustrates an embodiment of the mapping interface of FIG. 4 displaying notifications of a triggered geofence.
Figure 6:
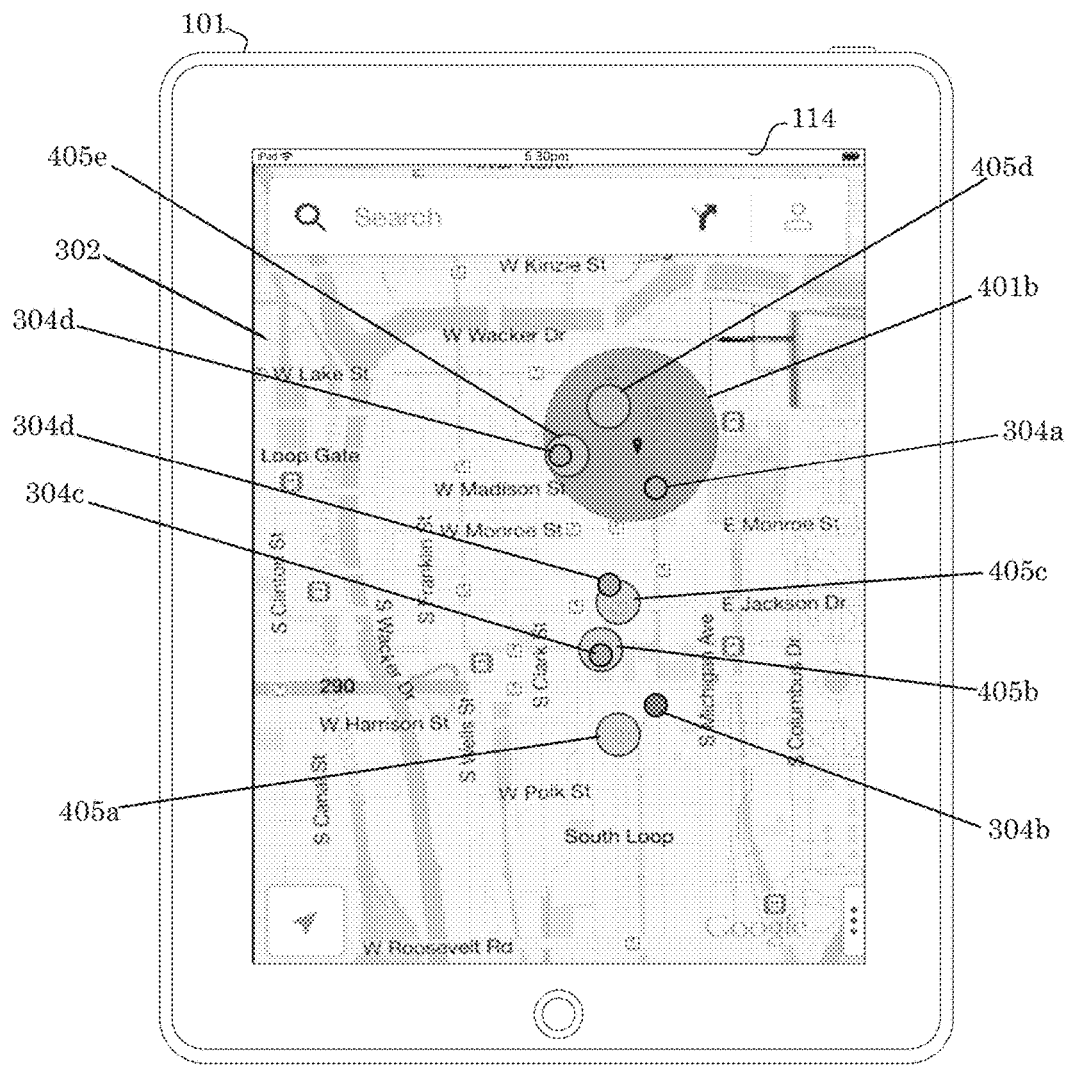
FIG. 6 illustrates an embodiment of the mapping interface of FIG. 4 mapping the parent geofence in an alternative location.
Figure 7:
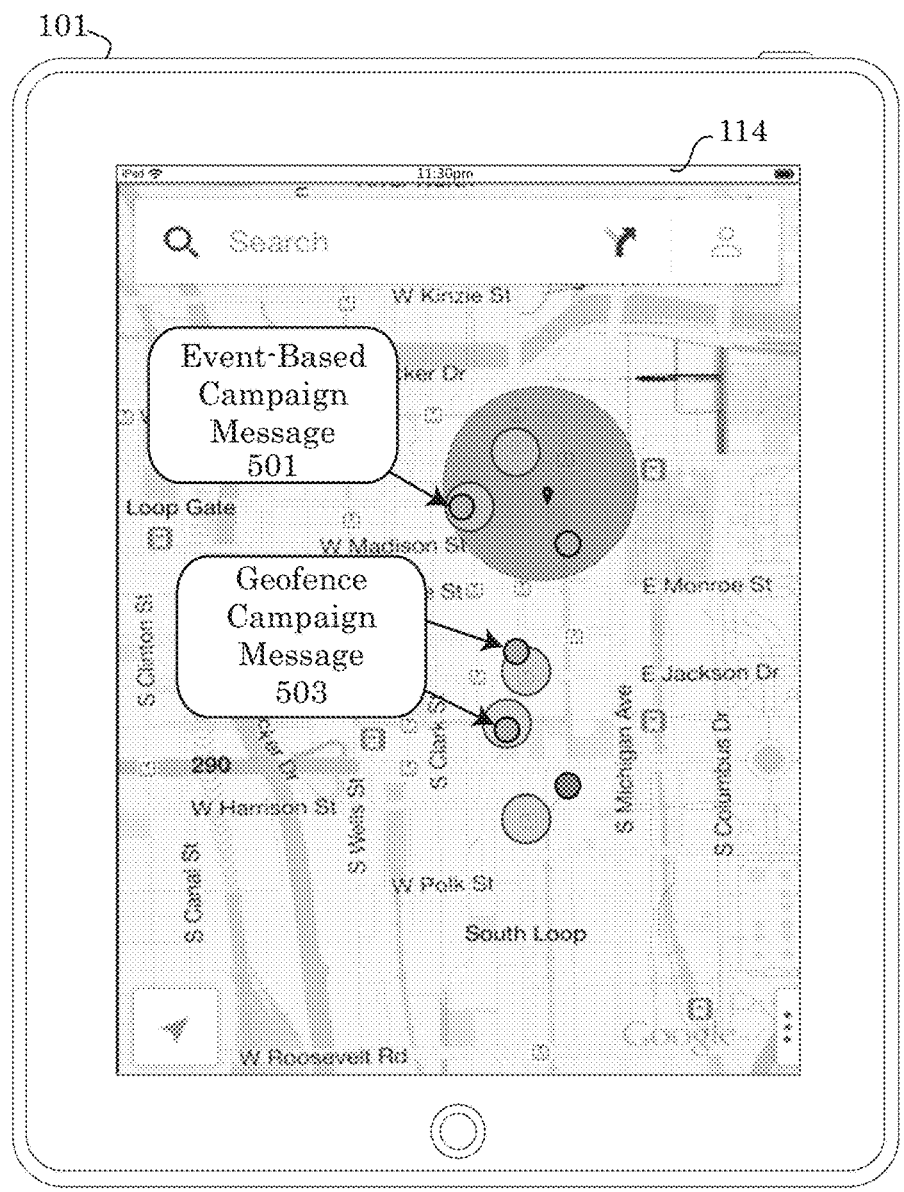
FIG. 7 illustrates an embodiment of the mapping interface of FIG. 6 displaying notifications of a triggered geofence.

As depicted in FIG. 5, the device locations 304 of one or more client devices 101 may affect whether or not a client device 101 triggers a geofence notification and the type of geofence notification received by the client device 101. For example, as shown in FIG. 4-5, the client device 101 residing at device location 304d is entering or dwelling within child geofence 405e. At the snapshot of time shown in FIG. 5, the child geofence 405e does not overlap with the currently active parent geofence 401a. Accordingly, as shown in FIG. 5, the client device triggering the child geofence may receive a child notification message because the device location has not triggered the parent 401a and child 405e geofences simultaneously. In some embodiments, the parent geofence 401a, 401b may be programmed to move or change positions. As shown in FIG. 7, the parent geofence 401a has transitioned to a new location designated by parent geofence 401b. As a result of the change in position of the parent geofence 401a, 401b, device location 304d now resides within both the child geofence 405e and parent geofence 401b. Therefore, in this second example, the client device has triggered both the parent and child geofences simultaneously. As a result, the previously displayed child notification message 503 may be altered to display a special event notification 501 which may be linked to the marketing campaign of the parent geofence 401b.

A slightly different situation is shown at device location 304d. In some embodiments of the geofence system 100, an altered notification directed to the special event of the parent geofence may not be triggered or displayed by a client device entering a section of a child geofence 405c that does not overlap with the parent geofence 401a. As shown in FIG. 4-5, the client device residing at device location 304d enters child geofence 405c which is depicted as being partially overlapped by the parent geofence 401a. Since at the particular time depicted by FIGS. 4-5, the client device 101 has triggered only the child geofence 405c and has not transitioned into parent geofence 401a, the geofence system 100 may display the child notification 503 associated with triggering the child geofence 403c. However, as the parent geofence moves north on the mapping interface 302, the client device 101 at device location 304d may trigger both the parent geofence 401 and the child geofence 405c and thus alter the child notification 503 to the special event notification 501 tied to the parent geofence 401.

Conversely, the client device 101 having a device location 304c may experience the opposite change in the notification displayed by the client device 101. As shown by FIGS. 4-5, the client device 101 at device location 304c may be triggering both child geofence 405b and parent geofence 401a overlapping the child geofence 405b. As a result of simultaneously triggering both the parent geofence 401a and the child geofence 405b, the client device at device location 304c may display an altered notification that would not typically be displayed by the child geofence 405b triggered alone. As shown in FIG. 5, the notification displayed may be a special event notification 501, particularly tied to the current event, promotion, marketing campaign, etc. tied or linked to the parent marketing campaign 401a. As the parent geofence 401a moves from the first position to a second location 401b, the child geofence 405b is no longer overlapping with the parent geofence 401b in the new location. Accordingly, the notification displayed by the client device 101 residing at the device location 304c may revert back to the child notification message 503 that may have been previously displayed prior to the activation of the parent geofence 401.

In some embodiments, the parent geofences may become inactive once the special event or promotion linked to the parent geofence has ended or completed. In alternative embodiments, the deletion module 335 of the geofence management system 301 may schedule the parent geofence and/or the child geofence for deletion. In certain embodiments, the geofences may not be deleted, but rather the parent or child geofences may be scheduled for reactivation at a later time period prescribed by the geofence management system 301 or the campaign management system 201. For example, the marketing campaign of the parent geofence may be a rolling campaign that periodically activates and deactivates the parent geofence for a set period of time before reactivating the parent geofence automatically. In some embodiments, the tracking module 327 of the geofence management system may continue to collect and report informational device data (or metadata) about the client devices 101 that may continue to enter, dwell or exit the boundary of the deactivated parent geofence and/or child geofence. The collected informational device data may be transmitted by the geofence management system 301 to the campaign management system 201 for storage and to determine the popularity of a parent or child geofence campaign or potential geofence region. The campaign module 225 may determine one or more particular regions on the map to be optimal locations or demographics when it comes time to activate a new parent or child geofence. Likewise, the campaign module 225 may also determine that a selected region for a parent or child geofence does not meet a particular standard. For example the previously selected location may not attract enough client devices 101 or attract users of a particular demographic sought by the special event or promotion modifying the messages of the child geofence notification.

The geofence system 100 and each of the hardware and software components comprising the geofence system, including the geofence management system 301, client device 101 and the campaign management system 201 improve the overall functionality of the computer systems disclosed. Namely, the geofence system 100 of the current application improves the functionality of each computer system to transmit and modify geofence notifications with higher efficiency and remove the redundancy of existing geo-fencing methods and systems.

Unlike existing geofences that create, inactivate and/or delete geofences as the geofence notification becomes outdated or temporarily obsolete, the geofence system 100 of the current application removes the need to delete and/or recreate and re-transmit child geofence data to the client device 101 every time a special promotion overrides an existing geofence or a returning promotion. For example, an existing geofence system may perform the steps of creating a geofence having a specific notification when an associated transition is performed. Subsequently, the created geofence promotion or notification may become temporarily obsolete in favor of a new promotion. Instead of overriding the current geofence with a parent geofence, existing geofence systems may delete or inactivate the created geofence and replace the geofence with a new geofence operating at the same location. However, once the temporary promotion ends and the existing geofence system will need to delete the temporary promotion geofence and reactivate or re-create the previous geofence.

The method of continuously activating, deleting and recreating geofences in order to provide the most up to date notifications to the user's client device 101 become incredibly inefficient. The system of the present disclosure significantly improves the functionality of the computer systems by decreasing and eliminating tasks and routines that may be performed to update a location with an updated geofence and/or notification. Using the geofence system 100 of the present disclosure, instead of having to deactivate or delete geofences and potentially recreate them at a later point in time, the geofence system of the current application reduces the steps by simply overlaying an existing geofence with a new parent geofence that will display the updated message associated with the parent geofence once the parent geofence and the existing geofence are triggered together. The existing geofence does not need to be deactivated and/or reactivated. Once the parent geofence expires or is removed, the underlying existing geofence can be triggered again by client devices and transmit the legacy notification to client devices 101 triggering the geofence once again.

Method for Providing a Geofence Notification

Figure 8:
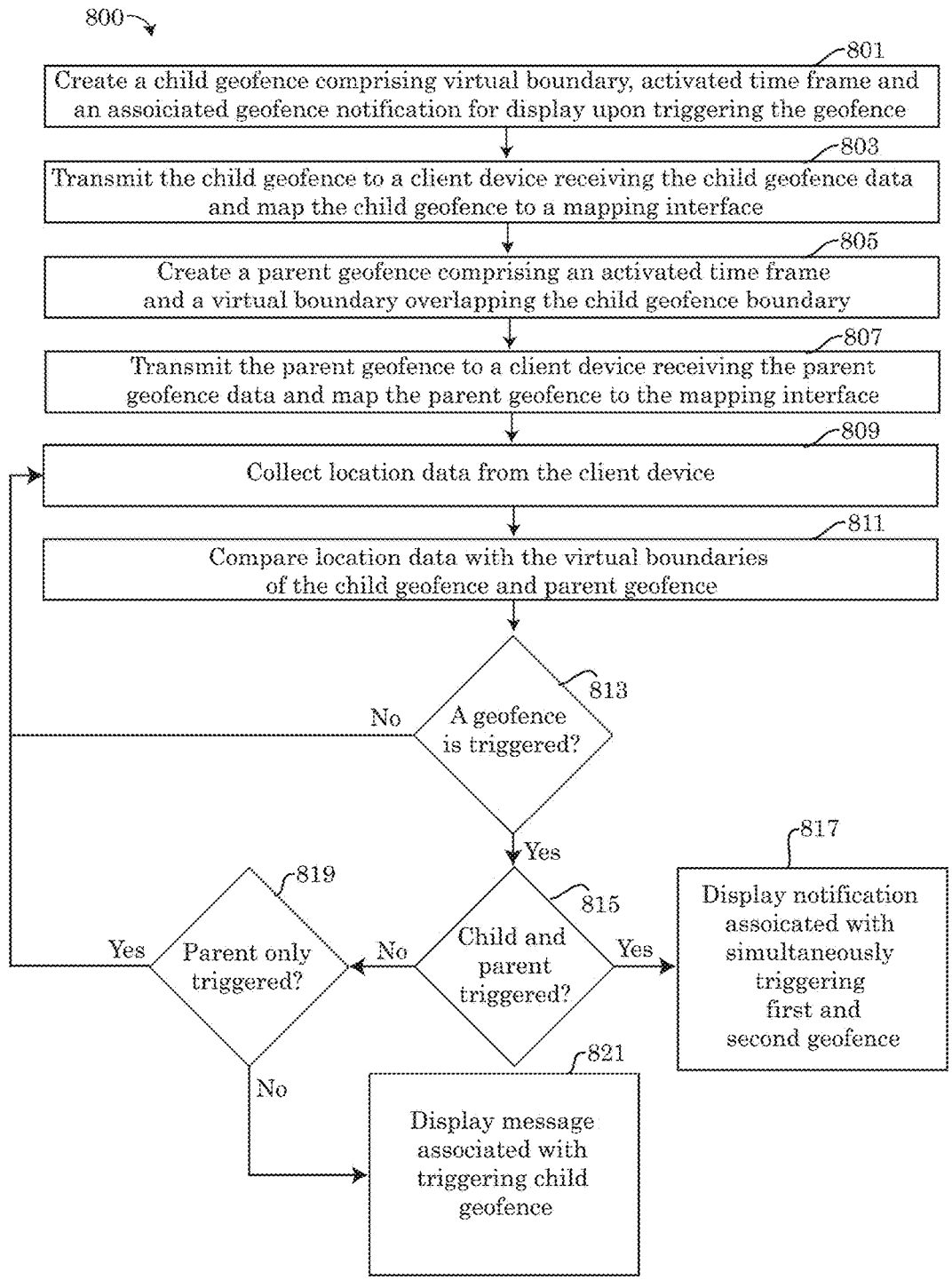
FIG. 8 illustrates an embodiment of a method for providing a geofence notification.

The drawing of FIG. 8 represents an embodiment of a method or algorithm that may be implemented for providing a geofence notification in accordance with the geofence systems 100 described in FIGS. 1-7, using one or more computer systems as defined generically in FIG. 9 below, and more specifically by the embodiments of specialized computer systems 101, 201, 301 presented in FIGS. 1-7. A person skilled in the art should recognize that the steps of the algorithm described in FIG. 8 may be performed in a different order than presented by FIG. 8 and the algorithm may not require all of the steps described herein to be performed. Rather, some embodiments may alter the geofence notifications using only one or more of the steps discussed below.

The embodiment of the method 800 for providing a geofence notification may begin at step 801. In step 801, the creation module 333 of the geofence management system 301 may create a child geofence comprising a virtual boundary having a location and size, a time frame for activation including a duration having a start date/time and an end date/time for expiration, as well as a geofence notification that may be associated with the child geofence that may be displayed once the child geofence is triggered. Once created by the geofence management system, the server module 307 of the geofence management system 301 may in step 803 transmit the child geofence to a client device 101. The client device 101 receiving the geofence data of the child geofence may map the child geofence to a mapping interface 302.

In step 805 of the method 800, the geofence system 100 and more particularly the creation module 333 of the geofence management system 301 may create a parent geofence. The parameters of the parent geofence may also comprise a time frame for being active including a start time/date, end time/date defining the set duration and expiration of the parent geofence. Embodiments of the parent geofence may further include a virtual boundary which may be defined by the location of the geofence and the size (i.e. radius) of the boundary surrounding the location selected for the geofence. Embodiments of the parent geofence location may be selected to overlap one or more child geofences. Moreover, in some embodiments of the parent geofence, the parent geofence may have a define path of movement from one location to another or set intervals for changing the location of the parent geofence. By changing the location of the parent geofence, the parent geofence may overlap different child geofence at different times, depending on the parent geofence's defined path of movement from one location to a subsequent location.

In step 807, the parent geofence may be encoded, compressed and/or transmitted by the server module 307 over network 120 to the client device 101. The client device 101 may receive the geofence data of the parent geofence and map the parent geofence to the mapping interface 302 via the mapping module 207. The server module 307 may periodically transmit updated geofence data to the mapping module 207 and/or the mapping module 207 may request, retrieve or download updated geofence data periodically. Updated geofence data may include updates to the number of parent or child geofences, the status (active or inactive) of the parent or child geofence, geofence location changes, changes to the notification messages and/or changes in triggering transitions.

In step 809 of the method for altering geofence notifications, the locations module 105 of the client device 101 may collect location data 106 from one or more client devices 101 being tracked by the geofence system 100. The location data 106 collected by the location module may be stored locally by the location module 105, the client device's memory device 115, a local database 111 and/or a network accessible data storage device such as network repository 139. In step 811 of the method 800, the mapping module 207 of the client device 101 and/or the tracking module 327 of the geofence management system 301 may compare the location data 106 of the client device 101 with the virtual boundaries of the child geofence and/or the parent geofence mapped to the mapping interface 302.

In some embodiments of the comparison step 811, the mapping module 207 and/or the tracking module 327 may perform a series of determinations to ascertain which notification (if any) should be displayed by the client device 101. In step 813, a determination may be made by the geofence system 813 whether or not a geofence created by the geofence system 100 has been triggered by the client device and the client device's current location 304. To evaluate whether a parent and/or child geofence has been triggered, the mapping module 207 or the tracking module 327 may compare the location data 106 of the client device 101 with virtual boundary of each active geofence mapped by the mapping module 207. Furthermore, the location data may be compared in conjunction with the appropriate transitions assigned to each geofence (enter, exit, dwell). Using the location data 106, the virtual boundaries of the parent and child geofence and the designated transitions, step 813 may determine whether or not one or more geofences have been triggered.

If, in step 813, it is determined by the geofence system 100 that neither a parent, nor child geofence has been triggered, the method 800 may return back to step 809 and continue to collect location data from the location module 105. However, if, in step 813 it is determined by the geofence system 100 that one or more geofences have been triggered, the method 800 may proceed to step 815. In step 815, the geofence system 100 may further evaluate whether or not the child geofence and the parent geofence have been triggered simultaneously by the client device entering the virtual boundary of both geofences and satisfying an appropriate transition for each of the geofences. Satisfaction of triggering both the parent and child geofences simultaneously may result in proceeding to step 817, wherein the notification displayed by the display device 114 of the client device 101 may be a notification altering the child geofence notification. More specifically, the altered notification may be a notification programmed by the marketing campaign or special event associated with the parent geofence.

If, on the other hand, the geofence system 100 determines that the child geofence and the parent geofence have not been both triggered simultaneously or near simultaneously, the mapping module 107 and/or the tracking module 327 may identify which geofence has been triggered. In step 819, a determination is made whether only the parent geofence has been triggered by the client device 101. Triggering only the parent geofence may not display a notification because the parent geofence may be directed toward altering the child geofence's notifications but tailored to a special event or promotion. Therefore, if only the parent geofence has been triggered, without triggering the child geofence, the method 800 may return to step 809 and continue to collect location data 106 from the location module 105 of the client device 101. Conversely, if the geofence system 100 has determined in step 815 that the parent and child geofences have not been triggered simultaneously and the geofence system 100 has further determined in step 819 that the parent alone has not been triggered by the client device, the geofence system 100 may conclude that only the child geofence has been triggered by the client device. Accordingly, in step 821, the client device 101 may display via the display device 114 the child geofence notification which may differ from the notification that is displayed in step 817 for triggering both the parent and child notification simultaneously.

Computer System

Referring to the drawings, FIG. 9 illustrates a block diagram of a computer system 900 that may be included in the systems of FIGS. 1-7 and for implementing methods for providing a geofence notification as shown in the embodiment of FIG. 8 and in accordance with the embodiments described in the present disclosure. The computer system 900 may generally comprise a processor, otherwise referred to as a central processing unit (CPU) 991, an input device 992 coupled to the processor 991, an output device 993 coupled to the processor 991, and memory devices 994 and 995 each coupled to the processor 991. The input device 992, output device 993 and memory devices 994, 995 may each be coupled to the processor 991 via a bus. Processor 991 may perform computations and control the functions of computer 900, including executing instructions included in the computer code 997 for tools and programs for creating geofences and triggering a geofence notification, in the manner prescribed by the embodiments of the disclosure using the systems of FIGS. 1-7, wherein the instructions of the computer code 997 may be executed by processor 991 via memory device 995. The computer code 997 may include software or program instructions that may implement one or more algorithms for implementing the methods for providing a geofence notification, as described in detail above. The processor 991 executes the computer code 997. Processor 991 may include a single processing unit, or may be distributed across one or more processing units in one or more locations (e.g., on a client and server).

The memory device 994 may include input data 996. The input data 996 includes any inputs required by the computer code 997. The output device 993 displays output from the computer code 997. Either or both memory devices 994 and 995 may be used as a computer usable storage medium (or program storage device) having a computer readable program embodied therein and/or having other data stored therein, wherein the computer readable program comprises the computer code 997. Generally, a computer program product (or, alternatively, an article of manufacture) of the computer system 900 may comprise said computer usable storage medium (or said program storage device).

Memory devices 994, 995 include any known computer readable storage medium, including those described in detail below. In one embodiment, cache memory elements of memory devices 994, 995 may provide temporary storage of at least some program code (e.g., computer code 997) in order to reduce the number of times code must be retrieved from bulk storage while instructions of the computer code 997 are executed. Moreover, similar to processor 991, memory devices 994, 995 may reside at a single physical location, including one or more types of data storage, or be distributed across a plurality of physical systems in various forms. Further, memory devices 994, 995 can include data distributed across, for example, a local area network (LAN) or a wide area network (WAN). Further, memory devices 994, 995 may include an operating system (not shown) and may include other systems not shown in the figures.

In some embodiments, the computer system 900 may further be coupled to an Input/output (I/O) interface and a computer data storage unit (for example a data store, data mart or repository). An I/O interface may include any system for exchanging information to or from an input device 992 or output device 993. The input device 992 may be, inter alia, a keyboard, a mouse, sensors, biometric input device, camera, timer, etc. The output device 993 may be, inter alia, a printer, a plotter, a display device (such as a computer screen or monitor), a magnetic tape, a removable hard disk, a floppy disk, etc. The memory devices 994 and 995 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 900, and may include any type of transmission link, including electrical, optical, wireless, etc.

An I/O interface may allow computer system 900 to store information (e.g., data or program instructions such as program code 997) on and retrieve the information from a computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that implements a method for providing a geofence notification, to deploy or integrate computing infrastructure with respect to triggering the geofence notifications. Thus, an embodiment of the present invention discloses a process for supporting computer infrastructure, where the process includes providing at least one support service for at least one of integrating, hosting, maintaining and deploying computer-readable code (e.g., program code 997) in a computer system (e.g., computer 900) including one or more processor(s) 991, wherein the processor(s) carry out instructions contained in the computer code 997 causing the computer system to transmit geofence notifications. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method creating and terminating a campaign dependent geofence. Thus the present invention discloses a process for supporting, deploying and/or integrating computer infrastructure, integrating, hosting, maintaining, and deploying computer-readable code into the computer system 900, wherein the code in combination with the computer system 900 is capable of performing a method of triggering a geofence notification.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamically displaying geofences comprising the steps of:
   creating, by a processor, a moveable parent geofence, wherein the movable parent geofence is broadcasted by a mobile computer system transported by a user having variable location changes as a function of a movement of the user, and wherein the movable parent geofence corresponds to a temporary event having a pre-set duration, expiration date and programmed path of movement;
   further creating, by the processor, a first child geofence and a second child geofence;
   determining, by the processor, a location of a client device;
   triggering, by the processor, a notification as a function of the location of the client device residing within either a boundary of the moveable parent geofence and a boundary of the first child geofence or the boundary of the moveable parent and a boundary of the second child geofence;
   displaying, by the processor, the notification as a function of triggering both the moveable parent geofence and the first child geofence or the moveable parent geofence and the second child geofence.

2. The method of claim 1, further comprising the step of:
   separately triggering, by the processor, the first child geofence or the second child geofence without triggering the moveable parent geofence; and
   displaying, by the processor, a child geofence notification having a different message than the notification displayed by triggering both the moveable parent geofence and first child geofence or the second child geofence.

3. The method of claim 1, wherein the notification for triggering both the moveable parent geofence and the first child geofence is different than the notification for triggering the movable parent geofence and the second child geofence.

4. The method of claim 1, further comprising the step of:
   triggering, by the processor, both the movable parent geofence and the second child geofence, as a function of the location of the client device; and
   displaying, by the processor, the notification via the client device.

5. The method of claim 1, wherein the moveable parent geofence may alter each child geofence temporarily as each child geofence is overlapped by the parent geofence while the programmed path of movement changes location of the moveable parent geofence.

6. The method of claim 1, further comprising the step of:
   removing, by the processor, the parent geofence as a function of the parent geofence reaching the expiration date;
   triggering, by the processor, the first child geofence or second child geofence as a function of the location of the client device within the boundary of the first child geofence or the boundary of the second child geofence;
   displaying, by the processor, a child geofence notification.

7. The method of claim 1, further comprising providing at least one support service for at least one of creating, integrating, hosting, maintaining, and deploying computer-readable program code in a computer system, where the computer-readable program code in combination with the computer system is configured to implement the steps of creating, further creating, determining, triggering and displaying.

8. A computer system, comprising:
   a central processing unit (CPU);
   a memory device coupled to the CPU; and
   a computer readable storage device coupled to the processor, wherein the storage device contains program code executable by the CPU via the memory device to implement a method for dynamically displaying geofences comprising the steps of:

creating, by the CPU, a moveable parent geofence, wherein the movable parent geofence is broadcasted by a mobile computer system transported by a user having variable location changes as a function of a movement of the user, and wherein the movable parent geofence corresponds to a temporary event having a pre-set duration, expiration date and programmed path of movement;

further creating, by the CPU, a first child geofence and a second child geofence;

determining, by the processor, a location of a client device;

triggering, by the CPU, a notification as a function of the location of the client device residing within either a boundary of the moveable parent geofence and a boundary of the first child geofence or the boundary of the moveable parent and a boundary of the second child geofence;

displaying, by the CPU, the notification as a function of triggering both the moveable parent geofence and the first child geofence or the moveable parent geofence and the second child geofence.

9. The system of claim 8, further performing the steps of:

separately triggering, by the CPU, the first child geofence or the second child geofence without triggering the moveable parent geofence; and displaying, by the CPU, a child geofence notification having a different message than the notification displayed by triggering both the moveable parent geofence and first child geofence or the second child geofence.

10. The system of claim 8, wherein the notification for triggering both the moveable parent geofence and the first child geofence is different than the notification for triggering the movable parent geofence and the second child geofence.

11. The system of claim 8, wherein the moveable parent geofence may alter each child geofence temporarily as each child geofence is overlapped by the parent geofence while the programmed path of movement changes location of the moveable parent geofence.

12. The system of claim 8, further comprising the steps of:

removing, by the CPU, the parent geofence as a function of the parent geofence reaching the expiration date;

triggering, by the CPU, the first child geofence or second child geofence as a function of the location of the client device within the boundary of the first child geofence or the boundary of the second child geofence;

displaying, by the CPU, a child geofence notification.

13. A computer program product comprising:

one or more computer readable hardware storage devices having computer readable program code stored therein, said program code containing instructions executable by the one or more central processing units (CPU) to implement a method for dynamically displaying geofences comprising the steps of:

creating, by the CPU, a moveable parent geofence, wherein the movable parent geofence is broadcasted by a mobile computer system transported by a user having variable location changes as a function of a movement of the user, and wherein the movable parent geofence corresponds to a temporary event having a pre-set duration, expiration date and programmed path of movement;

further creating, by the CPU, a first child geofence and a second child geofence;

determining, by the processor, a location of a client device;

triggering, by the CPU, a notification as a function of the location of the client device residing within either a boundary of the moveable parent geofence and a boundary of the first child geofence or the boundary of the moveable parent and a boundary of the second child geofence;

displaying, by the CPU, the notification as a function of triggering both the moveable parent geofence and the first child geofence or the moveable parent geofence and the second child geofence.

14. The computer program product of claim 13, further performing the steps of:

separately triggering, by the CPU, the first child geofence or the second child geofence without triggering the moveable parent geofence; and displaying, by the CPU, a child geofence notification having a different message than the notification displayed by triggering both the moveable parent geofence and first child geofence or the second child geofence.

15. The computer program product of claim 13, wherein the notification for triggering both the moveable parent geofence and the first child geofence is different than the notification for triggering the movable parent geofence and the second child geofence.

16. The computer program product of claim 13, wherein the moveable parent geofence may alter each child geofence temporarily as each child geofence is overlapped by the parent geofence while the programmed path of movement changes location of the moveable parent geofence.

17. The computer program product of claim 13, further comprising the steps of:

removing, by the CPU, the parent geofence as a function of the parent geofence reaching the expiration date;

triggering, by the CPU, the first child geofence or second child geofence as a function of the location of the client device within the boundary of the first child geofence or the boundary of the second child geofence;

displaying, by the CPU, a child geofence notification.

\* \* \* \* \*